United States Patent [19]

Adachi

[11] Patent Number: 5,101,265

[45] Date of Patent: Mar. 31, 1992

[54] SECAM COLOR SIGNAL PROCESSING DEVICE

[75] Inventor: Takeshi Adachi, Kumagaya, Japan

[73] Assignee: Kabushiki Kaisha Toshiba, Kawasaki, Japan

[21] Appl. No.: 574,784

[22] Filed: Aug. 30, 1990

[30] Foreign Application Priority Data

Sep. 4, 1989 [JP] Japan .................................. 1-227321

[51] Int. Cl.⁵ ............................................. H04N 9/72
[52] U.S. Cl. ........................................ 358/34; 358/18; 358/23
[58] Field of Search .................. 358/21 R, 18, 34, 14, 358/23

[56] References Cited

U.S. PATENT DOCUMENTS 4,246,599 1/1981 Sugimoto et al. ...................... 358/23
4,623,914 11/1986 Kuribayashi ........................... 358/18
4,766,485 8/1988 Takayama ............................. 358/34

Primary Examiner—John W. Shepperd
Assistant Examiner—Minsun Oh
Attorney, Agent, or Firm—Cushman, Darby Cushman

[57] ABSTRACT

A SECAM chroma signal is filtered and supplied to a single axis demodulator, which demodulates first and second chroma signal components modulated with two carriers having frequencies above and below a center frequency, as well as an identification signal for discriminating the transmission order of the first and second chroma signals. An identification signal detector, supplied with the demodulated identification signal, discriminates the transmission order of the first and second chroma signals in accordance with a positive or negative polarity. A rectifier rectifies the discrimination signal, and generates an average output of the discrimination signal. A flip-flop circuit generates a switching signal representing periods of the first and second chroma signal components on the basis of the discrimination signal. An amplifier adjusts the level of the switching signal in accordance with the average output, and generates an off-set control signal. An adder adds the off-set control signal and the demodulated first and second color signals so that the first and second color signals have the same reference levels.

3 Claims, 4 Drawing Sheets

SECAM COLOR SIGNAL PROCESSING DEVICE

BACKGROUND OF THE INVENTION

1. Field of the Invention

This invention relates to a SECAM color signal processing device for use in the SECAM color television system.

2. Description of the Related Art

On the transmitter side of a SECAM color television system, an (R-Y) signal and a (B-Y) signal are alternately superposed on two modulation carriers having different frequencies, each signal corresponding to one horizontal line, and are then transmitted to a receiver as a chroma signal. Hence, the chroma signal consists of a component fOR including the (R-Y) signal and a component fOB including the (B-Y) signal, each component corresponding to alternate lines.

On the receiver side, a 1H delay circuit (H=horizontal period) delays the chroma signal for one horizontal period, and synchronizes a signal component and a subsequent signal component. In other words, the component fOR including the (R-Y) signal and the component fOB including (B-Y) signal are synchronized. The components foR and foB are separately derived from the chroma signal by operating a line switch and supplied to (R-Y) and (B-Y) demodulators, respectively. The (R-Y) and (B-Y) demodulators demodulate these components and generate the demodulated (R-Y) and (B-Y) signals, respectively.

In the conventional SECAM color signal processing device described above, the chroma signal is input to the 1H delay circuit, and both a delayed signal and a non-delayed signal are obtained. The non-delayed signal is input to an input terminal of the line switch having two input terminals and two output terminals, and is output alternately from the two output terminals in every horizontal period. The delayed signal is input to the other input terminal, and is output also alternately from the two output terminals. As a result, the component fOR including the (R-Y) signal is output from only one of the output terminals, and the component fOB including the (B-Y) signal from the other.

As has been described above, the (R-Y) and (B-Y) signals are separated in the step of processing the high-frequency chroma signal. Hence, the two signals may interfere with each other near the line switch. When this interference occurs, the color of the image on the screen is degraded, and adjacent color regions of the image are not clearly distinguishable.

SUMMARY OF THE INVENTION

It is accordingly an object of the present invention to provide a SECAM color signal processing device in which the color signal components do not easily interfere with each other, and adjacent color regions of the image on the screen of a television receiver are clearly distinguishable.

To achieve the object, the device of the invention comprises: a single axis demodulator, supplied with a SECAM chroma signal output from a filter, for demodulating first and second chroma signal components modulated with two carriers having frequencies above and below a center frequency and an identification signal for discriminating the transmission order of the first and second chroma signal components, and for generating demodulated first and second color signals and a demodulated identification signal; identification signal detecting means, supplied with the demodulated identification signal, for discriminating the transmission order of the first and second chroma signal components in accordance with a positive or negative polarity, and for generating a discrimination signal rectifying means for rectifying the discrimination signal, and for generating an average output of the discrimination signal; switching signal generating means for generating a switching signal representing periods of the demodulated first and second color signals on the basis of the discrimination signal; adjusting means for adjusting the level of the switching signal in accordance with the average output, and for generating an off-set control signal; and adder means for adding the off-set control signal and the demodulated first and second color signals so that the demodulated first and second color signals have the same reference levels.

In the above described device, since the DC off-set of the modulated first and second color signals for every line is canceled by the adjusting means and the adder means, utilizing the identification signal, the two color signals in the base band stage are easily synchronized, not in the chroma signal stage. Therefore, the two color signals scarcely interfere with each other, with the result that an improved color image quality is obtained.

DETAILED DESCRIPTION OF THE PREFERRED EMBODIMENTS

Figure 1:
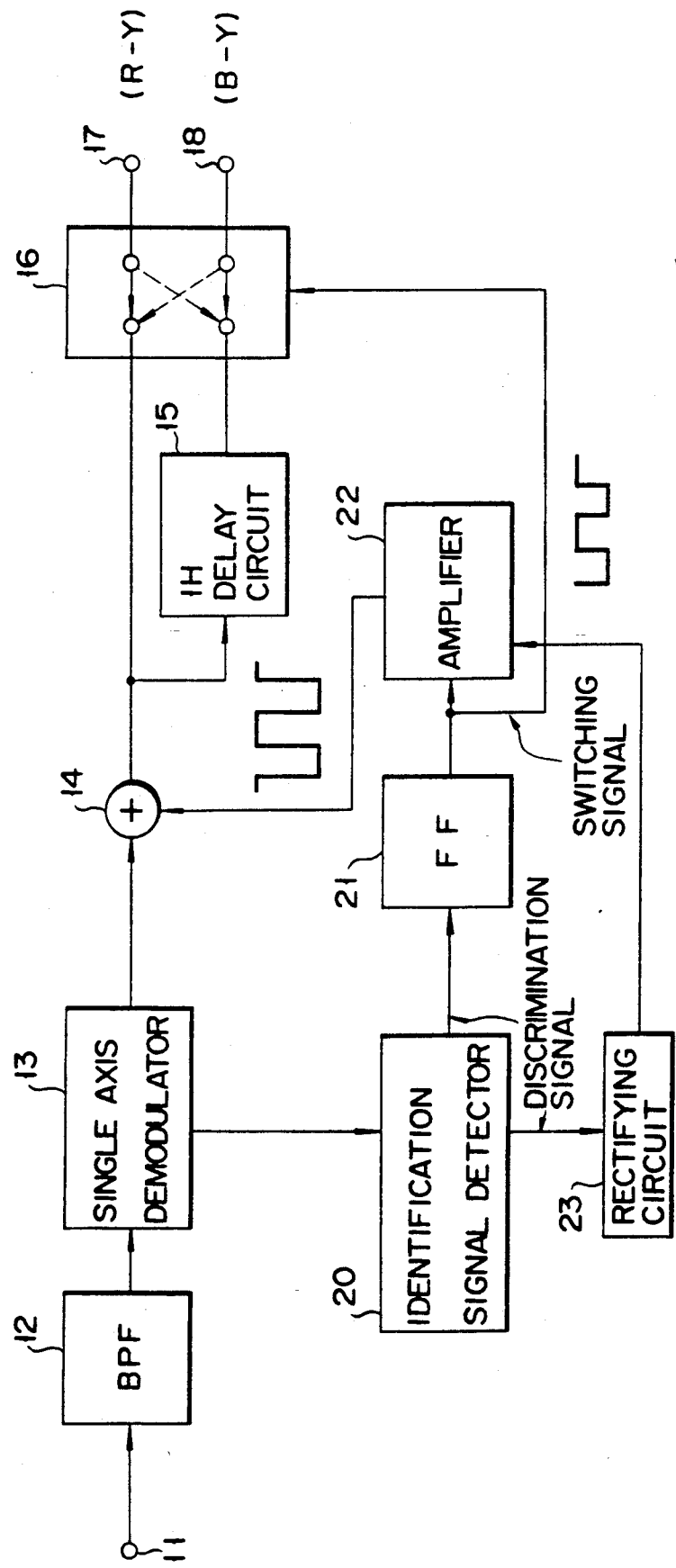
FIG. 1 is a block diagram showing an embodiment of the present invention.

FIG. 1 shows an embodiment of the present invention. A chroma signal according to the SECAM line sequential is input to input terminal 11. Band-pass filter (BPF) 12 filters the chroma signal. An output of band-pass filter 12 is supplied to single axis demodulator 13 and subjected to demodulation processing.

Single axis demodulator 13 uses a demodulation carrier. The frequency of demodulation carrier fO is set at a mean value between the frequencies of first and second chroma signal components fOB and fOR.

Figure 2:
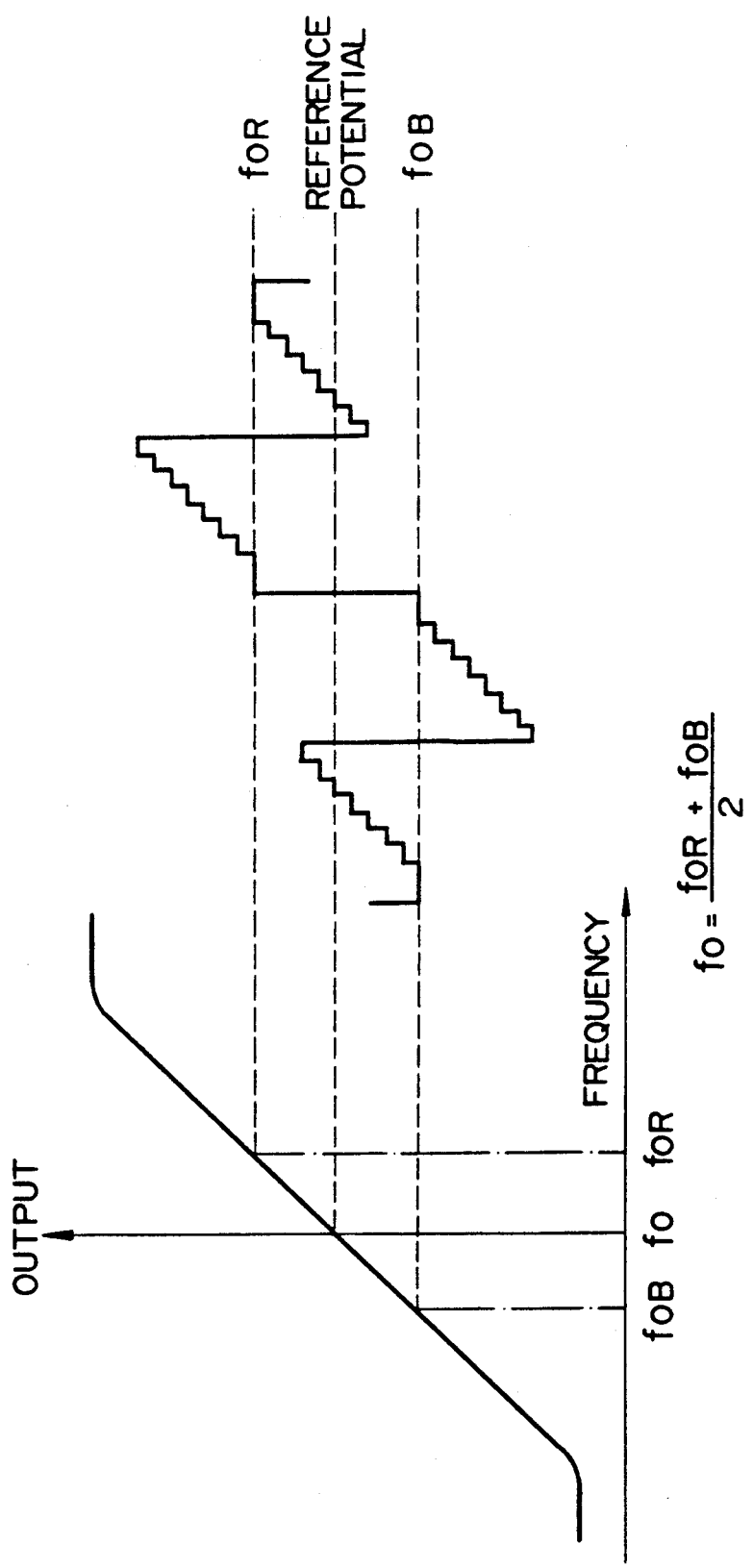
FIG. 2 shows signal waveforms explaining the operation of the single axis demodulator shown in FIG. 1.
Figure 3:
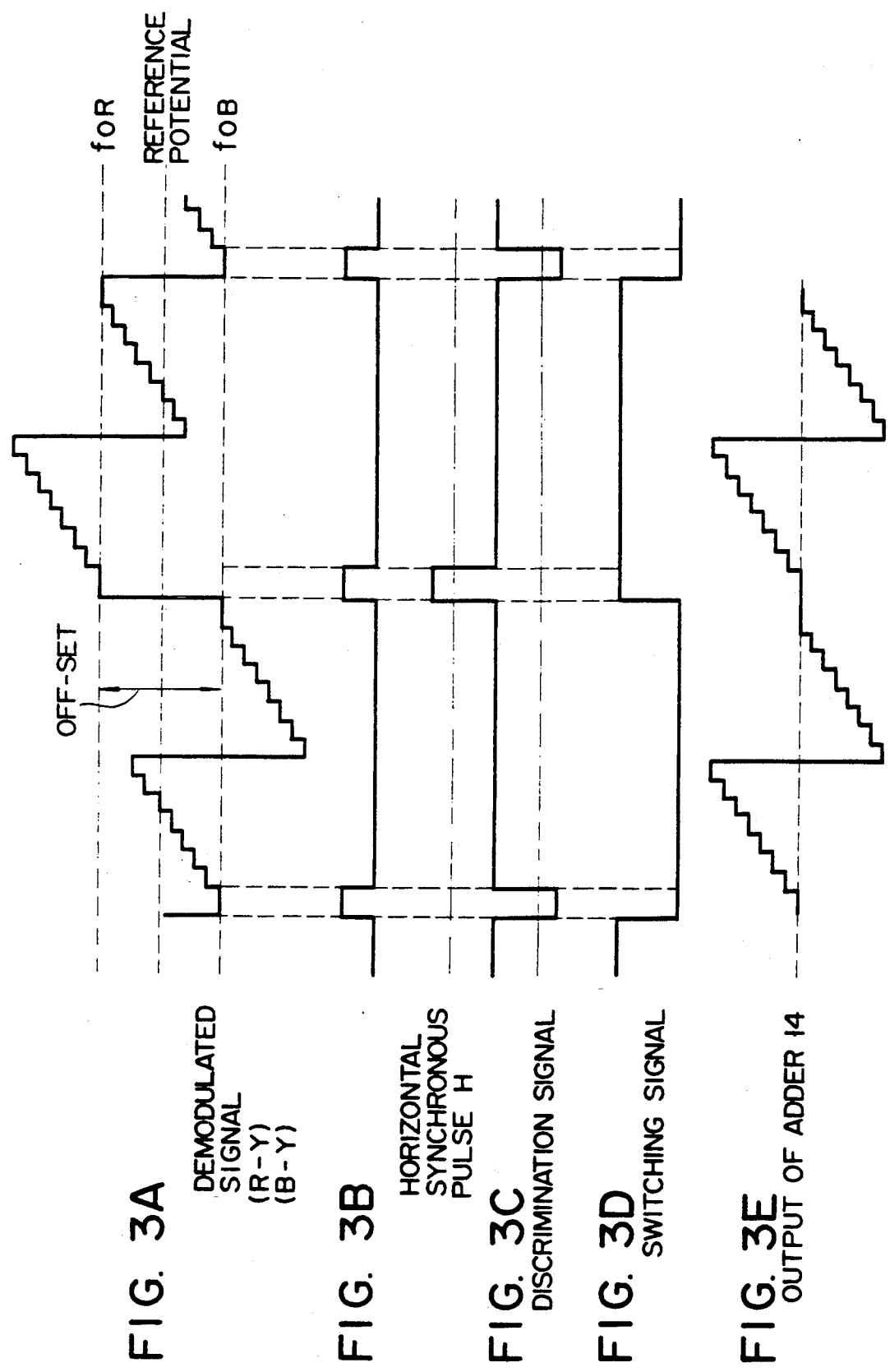
FIGS. 3A to 3E show waveforms explaining the operation of the circuit shown in FIG. 1.

FIG. 2 shows the relationship among the frequencies of demodulation carrier fO, and first and second chroma signals fOB and fOR. Single axis demodulator 13 generates demodulated (R-Y) and (B-Y) signals which are DC off-set for every horizontal line, as shown in FIG. 2 and FIG. 3A. The demodulated (R-Y) and (B-Y) signals are input to one of the terminals of adder 14.

Single axis demodulator 13 also generates demodulated identification signals DR and DB, which are supplied to identification signal detector 20. Identification signal detector 20 discriminates identification signals DR and DB during a pulse period of a horizontal synchronous pulse H (FIG. 3B), thereby determining the order in which the (R-Y) signal and the (B-Y) signal are transmitted, and outputs a discrimination signal representing the order. The discrimination signal is a pulse signal, and the polarity thereof is inverted for every horizontal line, for example, as shown in FIG. 3C.

The discrimination signal is supplied to flip-flop 21, which outputs a switching signal. The polarity of the switching signal is inverted for every horizontal line in accordance with the discrimination signal as shown in FIG. 3D.

The switching signal is input to amplifier 22 and also to a control terminal of line switch 16. Amplifier 22 amplifies the switching signal and generates an off-set control signal, which is supplied to adder 14.

A gain control signal, generated as described below, is also input to amplifier 22.

The discrimination signal is also supplied to rectifying circuit 23 from identification signal detector 20. Rectifying circuit 23 outputs a signal at the same level as the average level of the identification signal. The average level is proportional to the DC off-set of the demodulated (R-Y) and (B-Y) signals. The output of rectifying circuit 23 is used as a gain control signal. When the gain control signal is supplied to amplifier 22, amplifier 22 generates an off-set control signal of a level which can render the DC off-set of demodulated (R-Y) and (B-Y) signals 0, and supplies it to adder 14. As a result, adder 14 generates a demodulated signal having no DC off-set as shown in FIG. 3E.

The output signal of adder 14 is supplied to 1H delay circuit 15 having a one-horizontal period delay characteristic. The output signal of adder 14 is also supplied to one of the input terminals of line switch 16. The other input terminal of line switch 16 is connected to the output of 1H delay circuit 15. Line switch 16 has (R-Y) signal output terminal 17 and (B-Y) signal output terminal 18, which are switched every horizontal period so as to be connected to different input terminals. This switching is controlled by the above-mentioned switching signal output from flip-flop 21.

Figure 4:
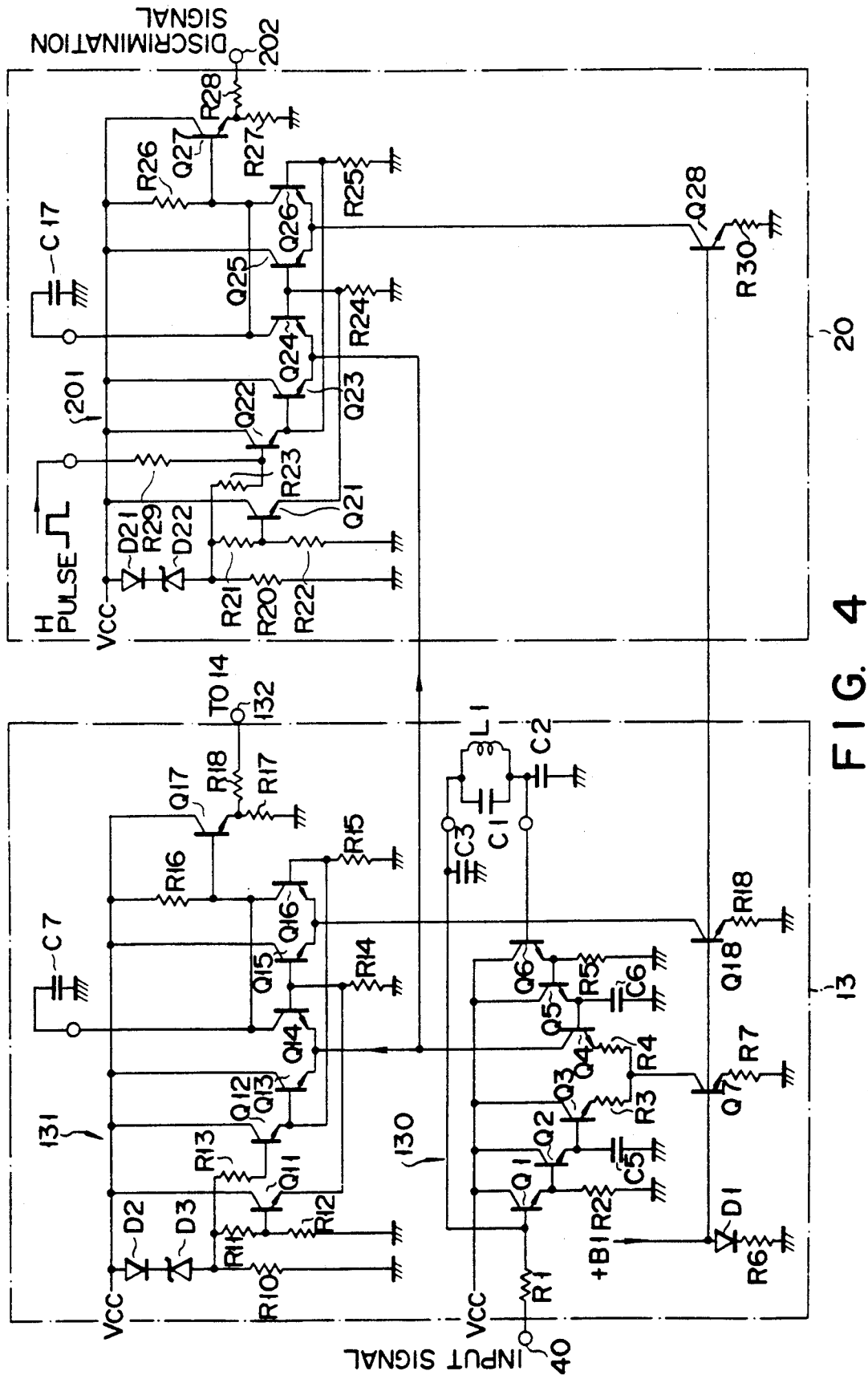
FIG. 4 is a circuit diagram showing detailed structure of the single axis demodulator and the identification signal detector shown in FIG. 1.

FIG. 4 is a circuit diagram showing in detail the structure of single axis demodulator 13 and identification signal detector 20.

As shown in FIG. 4, transistors Q1 to Q7, resistors R1 to R7, diode D1, capacitor C1 to C3, C5, C6, and coil L1 constitute demodulator section 130.

A chroma signal supplied through input terminal 40 is sent to the base of transistor Q1, and to one terminal of the parallel circuit made of capacitor C1 and coil L1. The other terminal of the parallel circuit is grounded through capacitor C2, and is also connected to the base of transistor Q6. Capacitor C3 is grounded and discharges any unnecessary components of the input chroma signal.

The collector of transistor Q1 is connected to the power source line, and the emitter thereof to a ground through resistor R2. The collector of transistor Q2 is connected to the power source line, and the emitter thereof is connected to the base of transistor Q3 and to a ground through capacitor C5. The collector of transistor Q3 is connected to the power source line, and the emitter thereof is connected to the emitter of transistor Q4 through resistors R3 and R4 connected in series. The node between resistor R3 and R4 is connected to the collector of transistor Q7. The collector of transistor Q6 is connected to the power source line, and the emitter thereof is connected to the base of transistor Q5 and to a ground through resistor R5. The collector of transistor Q5 is connected to the power source line, and the emitter thereof is connected to the base of transistor Q4 and to a ground through capacitor C6. The base of transistor Q7 is supplied with a stable voltage because of diode D1 and resistor R6, and the emitter thereof is grounded via resistor R7.

The circuit constituted by transistors Q1 to Q6, diode D1, and resistor R6, as arranged above, demodulates the chroma signal in the same manner as disclosed in U.S. Pat. No. 3,519,944. The demodulated output is supplied from the collector of transistor Q4 to identification signal detector 20 and to the common emitter of transistors Q13 and Q14.

Transistors Q11 to Q18, diodes D2 and D3, resistors R10 to R19, and capacitor C7 constitute amplifier 131, which generates a demodulated color signal to output terminal 132 and supplies the signal to adder 14. Diodes D2 and D3, and resistor R10 are connected in series between a power source line and a ground. The node between diode D3 and resistor R10 is connected to the base of transistor Q11 via resistor R11, and is grounded via resistors R11 and R12. The node is also connected to the base of transistor Q12 via resistor R13. The collectors of transistors Q11 and Q12 are connected to the power source line, and the emitter of transistor Q12 is connected to the bases of transistors Q13 and Q16, while the emitter of transistor Q11 is connected to the bases of transistors Q14 and Q15. The bases of transistors Q13 and Q16 are grounded via resistor R15, and the bases of transistors Q14 and Q15 are grounded via resistor R14. The collector of transistor Q14 is connected to the collector of transistor Q16, and to a ground via capacitor C7. The collectors of transistors Q13 and Q15 are connected to the power source line. The collector of transistor Q16 is also connected to the power source line, via resistor R16, and additionally connected to the base of transistor Q17. The collector of transistor Q17 is also connected to the power source line, and the emitter thereof is connected to a ground via resistor R17, and to output terminal 132 via resistor R18. The emitters of transistors Q15 and Q16 are connected to a ground via transistor Q18 and resistor R19 which constitute a constant current source.

Identification signal detector 20 comprises gate amplifier 201 having a structure similar to that of above-described amplifier 131. Gate amplifier 201 is constituted by transistors Q21 to Q28, resistors R20 to R30, diodes D21 and D22, and capacitor C17. Transistor Q28 and resistor R30 constitute a current source. The base of transistor Q22 is supplied with a horizontal sync pulse via resistor R29. Thus, gate amplifier 201 is in an ON state only during the period in which the horizontal sync pulse is supplied, and generates a demodulated identification signal which is sent to output terminal 202. The demodulated identification signal is used as a discrimination signal which represents the transmission order of the (R-Y) and (B-Y) signals.

According to the present invention as described above, the DC off-set of every line of the SECAM chroma signal demodulated output is canceled by the respective operations of the amplifier as adjusting means and the adder utilizing an identification signal. In addition, the two color signal components are synchronized easily in the base band stage rather than in the chroma signal stage. Hence, the two color signals rarely interfere with each other near the line switch, and the color image quality is improved. Moreover, since the single axis modulator is used, the entire structure of the device is simple.

What is claimed is:

1. A SECAM color signal processing device comprising:
a single axis demodulator, supplied with a SECAM chroma signal output from a filter, for demodulating first and second chroma signal components modulated with two carriers having frequencies above and below a center frequency, and an identification signal for discriminating the transmission order of the first and second chroma signal components, and for generating demodulated first and second color signals and a demodulated identification signal;
identification signal detecting means, supplied with the demodulated identification signal, for discriminating the transmission order of the first and second chroma signal components in accordance with a positive or negative polarity, and for generating a discrimination signal;
rectifying means for rectifying the discrimination signal, and for generating an average output of the discrimination signal;
switching signal generating means for generating a switching signal representing periods of the first and second chroma signal components on the basis of the discrimination signal;
adjusting means for adjusting the level of the switching signal in accordance with the average output, and for generating an off-set control signal; and
adder means for adding the off-set control signal and the demodulated first and second color signals so that the demodulated first and second color signals have the same reference levels.

2. A SECAM color signal processing device according to claim 1, wherein the output terminal of said adder means is connected to an input terminal of synchronizing means for synchronizing the first and second color signals,
said synchronizing means comprising:
a 1H delay circuit having a one-horizontal period delay characteristic, connected to the input terminal to which the output terminal of said adder means is connected; and
a line switch having an input terminal connected to the output terminal of said adder means and the other input terminal connected to the output terminal of said 1H delay circuit.

3. A SECAM color signal processing device, according to claim 2, wherein said line switch is controlled in accordance with the switching signal in every one horizontal period so that the demodulated first color signal is output only from one of the output terminals and the demodulated second color signal is output only from the other output terminal.

* * * * *